(12) United States Patent
Asao et al.

(10) Patent No.: US 10,855,371 B2
(45) Date of Patent: Dec. 1, 2020

(54) DEVICE, SYSTEM AND METHOD FOR VISIBLE LIGHT COMMUNICATION, AND DISPLAY DEVICE

(71) Applicant: Panasonic Intellectual Property Management Co., Ltd., Osaka (JP)

(72) Inventors: Yoshifumi Asao, Hyogo (JP); Shutai Okamura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/367,508

(22) Filed: Mar. 28, 2019

(65) Prior Publication Data

US 2020/0313767 A1    Oct. 1, 2020

(51) Int. Cl.
*H04B 10/116* (2013.01)
*G09G 5/12* (2006.01)

(52) U.S. Cl.
CPC .............. *H04B 10/116* (2013.01); *G09G 5/12* (2013.01); *G09G 2370/18* (2013.01)

(58) Field of Classification Search
CPC ..... H04B 10/116; G09G 5/12; G09G 2370/18
See application file for complete search history.

(56) References Cited

U.S. PATENT DOCUMENTS

| 9,166,810 | B2 | 10/2015 | Oshima et al. |
| 9,232,202 | B2 | 1/2016 | Togashi |
| 10,218,440 | B2 | 2/2019 | Cha |
| 2007/0058987 | A1 | 3/2007 | Suzuki |
| 2010/0188322 | A1 | 7/2010 | Furukawa |
| 2013/0242201 | A1 | 9/2013 | Deguchi et al. |

FOREIGN PATENT DOCUMENTS

| JP | 2003-318836 | 11/2003 |
| JP | 2011-9802 | 1/2011 |
| JP | 4821973 | 11/2011 |
| JP | 2013-197843 | 9/2013 |

OTHER PUBLICATIONS

Extended European Search Report dated Sep. 23, 2019 in European Application No. 19165787.3.

*Primary Examiner* — Michael Pervan
(74) *Attorney, Agent, or Firm* — Wenderoth, Lind & Ponack, L.L.P.

(57) ABSTRACT

A visible light communication device is a visible light communication device capable of communicating with an other communication device, and includes an image acquisition unit and an image processing unit. The image acquisition unit acquires a first image signal including an R component, a G component, and a B component, the first image signal being output based on a communication signal of a visible light communication. The image processing unit outputs a second image signal in which an influence of the R component of the first image signal is reduced during the visible light communication with the other communication device.

16 Claims, 27 Drawing Sheets

FIG. 8

| Monitor No. | LCD No. | Red Afterglow Characteristic |
|---|---|---|
| Monitor AA | LCD XX | Yes |
| Monitor AA | LCD XX | Yes |
| Monitor BB | LCD XX | Yes |
| Monitor BB | LCD XX | Yes |
| Monitor CC | LCD YY | No |
| Monitor CC | LCD YY | No |
| ⋮ | ⋮ | ⋮ |

Tbl

FIG. 26

| Terminal | Monitor No. | Red Afterglow Characteristic | Usable Image | Unusable Image |
|---|---|---|---|---|
| Terminal 1 | Monitor AA | Yes | Image E | Image B, Image C, Image D |
| Terminal 1 | Monitor BB | Yes | Image E | Image B, Image C, Image D |
| Terminal 2 | Monitor CC | No | Image B | ~ |
| Terminal 2 | Monitor AA | Yes | Image E | Image B, Image C, Image D |
| Terminal 2 | Monitor BB | Yes | Image E | Image B, Image C, Image D |
| Terminal 2 | Monitor CC | No | Image B | ~ |

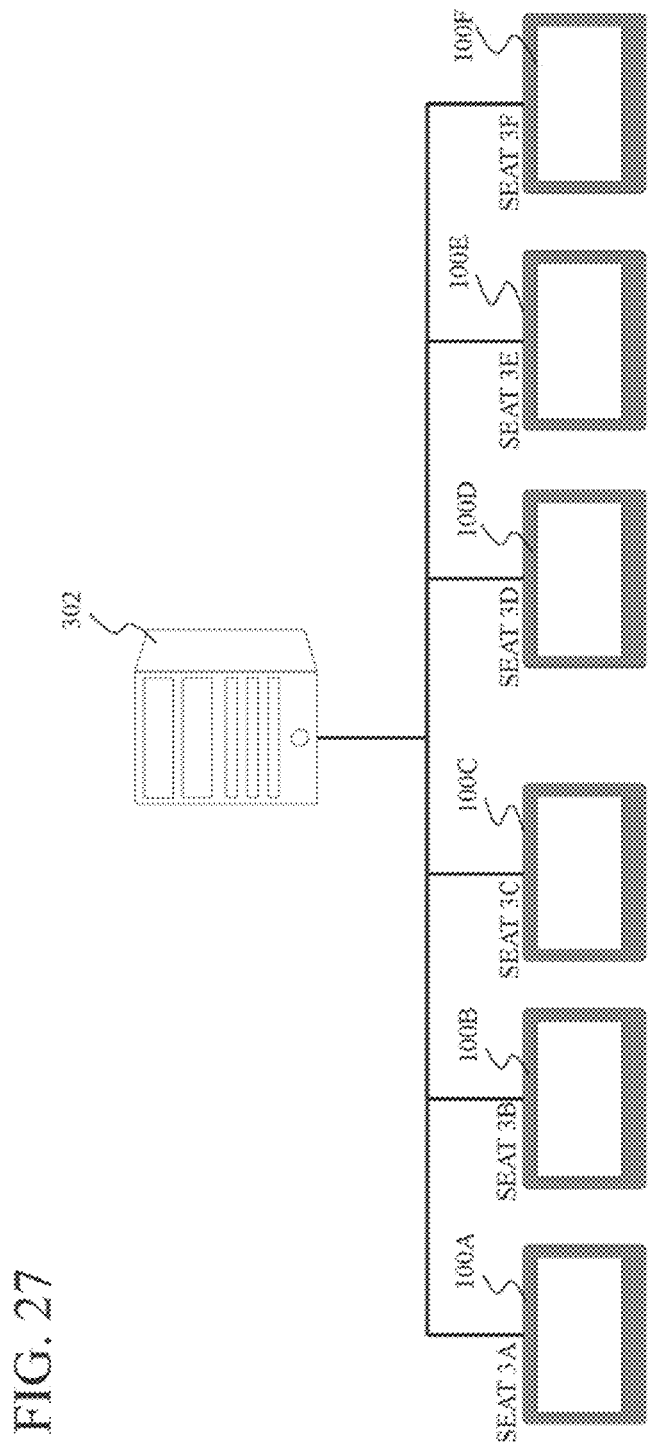

DEVICE, SYSTEM AND METHOD FOR VISIBLE LIGHT COMMUNICATION, AND DISPLAY DEVICE

BACKGROUND

Technical Field

The present disclosure relates to a device that performs communication using visible light.

Background Art

A wireless communication technology that uses light in a wavelength band visible to human eyes as a carrier is known as visible light communication. Visible light communication has advantages such as less effect on living bodies and not subjected to the restrictions of the Radio Law. However, visible light communication has not been widely used until now due to its need for special receivers and the flickering of light sources.

A method of visible light communication is disclosed in U.S. Pat. No. 9,166,810 B2 in which a sampling rate faster than that of a conventional method is realized by utilizing the line scan characteristic of a CMOS type image sensor. With this method, a typical smartphone camera can receive a high-speed modulation signal. In addition, this method can eliminate the effects of flickering on human eyes.

There is an increasing demand for monitors serving as light sources to have high resolution and wide color gamut. For example, there are monitor products in which the red coloring is improved by using a fluoride red (KSF) phosphor. KSF phosphor has good chromaticity of the red color but also has afterglow characteristics. When such a monitor having phosphor is used as a light source for visible light communication, the afterglow characteristics adversely affects communication which gives rise to a problem in that the communication efficiency is deteriorated.

BRIEF SUMMARY

The present disclosure provides a device effective in performing visible light communication even when using a monitor having afterglow characteristics.

A visible light communication device according to the present disclosure is a visible light communication device capable of communicating with an other communication device and includes an image acquisition unit and an image processing unit. The image acquisition unit acquires a first image signal including an R component, a G component, and a B component, which is output based on a communication signal of the visible light communication. The image processing unit outputs a second image signal in which an influence of the R component of the first image signal is reduced during the visible light communication with the other communication device.

A visible light communication system according to the present disclosure includes the visible light communication device and a display device or a terminal device capable of communicating with the visible light communication device.

A visible light communication method according to the present disclosure is a visible light communication method using a device that is capable of performing visible light communication, and the method includes: acquiring a first image signal including an R component, a G component, and a B component, which is output based on a communication signal of visible light communication; outputting a second image signal in which an influence of the R component of the first image signal is reduced during visible light communication; and displaying the second image signal on a display unit or reading information of a communication signal from the second image signal.

The display device according to the present disclosure is a display device including a screen capable of displaying an image, and the display device includes, at least while the display device and an other communication device perform visible light communication, a first image area displaying an image signal that includes at least one of a G component and a B component, and a second image area capable of displaying an image signal that includes only an R component.

BRIEF DESCRIPTION OF DRAWINGS

FIG. 8 shows a table illustrating an example of afterglow characteristics for each monitor according to the first exemplary embodiment.

FIG. 26 is a diagram illustrating an example of information held in a terminal information holding unit according to the third exemplary embodiment.

FIG. 27 is a schematic diagram illustrating a configuration of a monitor and a server according to the third exemplary embodiment.

DETAILED DESCRIPTION

Hereinafter, exemplary embodiments will be described in detail with reference to the drawings as appropriate. However, a detailed description more than necessary may be omitted. For example, detailed description of already well-known matters and redundant description of configurations that are substantially the same may be omitted. This is to avoid the following description from being unnecessarily redundant and thus to facilitate understanding of the description by those skilled in the art.

It is to be noted that the attached drawings and the following description are provided to enable those skilled in the art to fully understand the present disclosure, and therefore they are not intended to limit the subject matter described in the appended claims.

In the following embodiments, the term "image" may either be a still image or a moving image.

1. Exemplary Embodiment 1

The first exemplary embodiment will be described below with reference to FIGS. 1 to 14.

1.1 Configuration and Operation for Visible Light Communication

Figure 1:
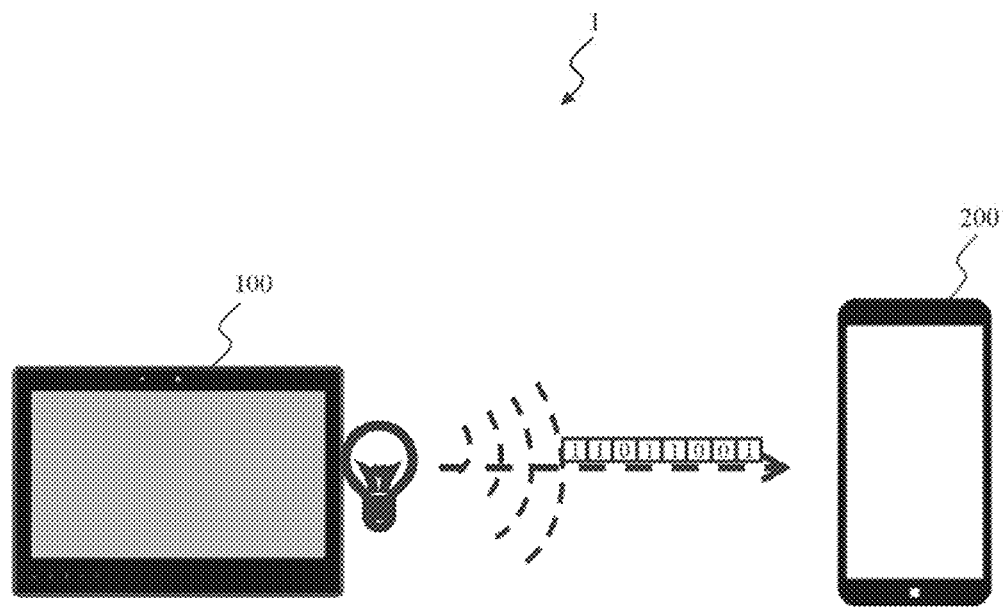
FIG. 1 is a schematic diagram illustrating an outline of visible light communication.

FIG. 1 is a diagram illustrating an outline of visible light communication. A monitor 100 (an example of a visible light communication device or a display device) is used as a transmitter, and transmits data consisting of 0 and 1 by switching the backlight OFF or ON. A mobile terminal 200 (an example of a visible light communication device or a terminal device) serves as a receiver to receive data by converting the OFF or ON of the backlight output into the data of 0 or 1. Performing this ON/OFF switching at a sufficiently high speed enables data communication to be performed without causing a user to sense the flickering of the screen.

Figure 2:
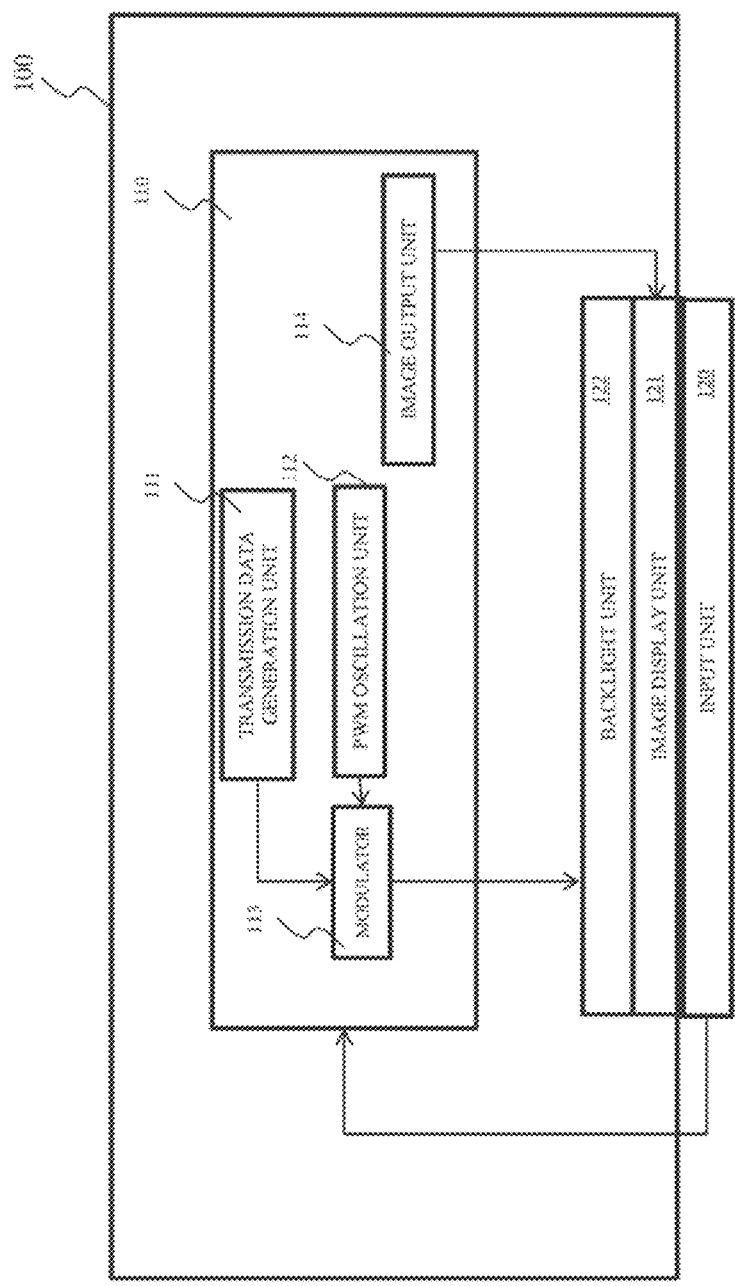
FIG. 2 is a block diagram illustrating a configuration of a monitor capable of performing visible light communication.

An internal configuration of the monitor 100 will be described in more detail with reference to FIG. 2. The monitor 100 includes a visible light communication output control unit 110, an input unit 120, an image display unit 121 (an example of a display unit), and a backlight unit 122. The visible light communication output control unit 110 includes a processor including a circuit such as a central processing unit (CPU), a graphics processing unit (GPU), or a digital signal processor (DSP). The processor executes a function of the visible light communication output control unit 110 in accordance with a program stored in a memory. The visible light communication output control unit 110 includes a transmission data generation unit 111, a PWM oscillation unit 112, a modulator 113, and an image output unit 114. The visible light communication output control unit 110 may be configured of one semiconductor chip.

The input unit 120 can be realized by a touch panel, a keyboard, a remote-control receiver, or the like, and can transition the internal state of the monitor 100 through an operation of the user. The transmission data generation unit 111 generates a data sequence to be transmitted, and outputs the data sequence to the modulator 113. The PWM oscillation unit 112 generates a periodic signal that is the source of modulation, and outputs the periodic signal to the modulator 113 as well. The modulator 113 generates a light emitting pattern of the backlight unit 122 based on the input from the transmission data generation unit 111 and the PWM oscillation unit 112, and outputs the light emitting pattern. The backlight unit 122 emits light based on the input of the modulator 113. The image output unit 114 is able to generate image data to be displayed on the monitor 100 and store the image data in the memory, and outputs the generated data to the image display unit 121.

The image display unit 121 is, for example, a liquid crystal panel including a polarizing plate, a glass substrate, a color filter, an electrode and the like. The backlight unit 122 includes a light source such as an LED that emits light in accordance with the output of the modulator 113. With these configurations, the monitor 100 is capable of transmitting a desired data sequence by visible light communication while projecting a display image on the image display unit 121.

Figure 3:
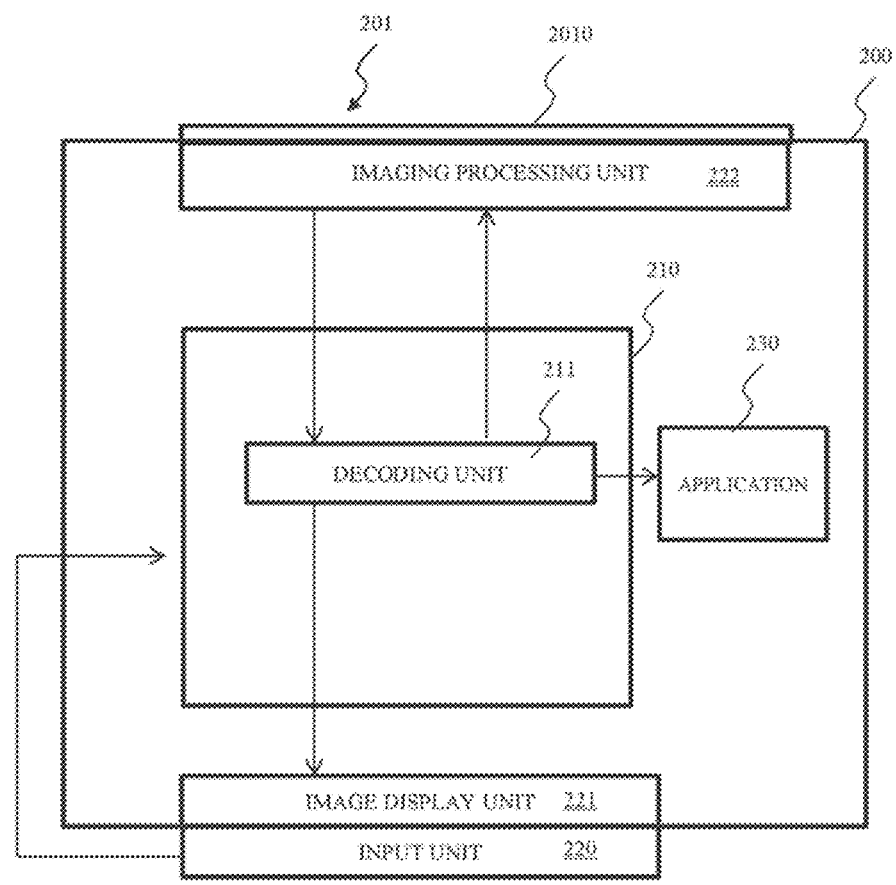
FIG. 3 is a block diagram illustrating a configuration of a mobile terminal capable of performing visible light communication.

Next, an internal configuration of the mobile terminal 200 will be described with reference to FIG. 3. The mobile terminal 200 includes a camera 201, a visible light communication input control unit 210, an input unit 220, an image display unit 221, an imaging processing unit 222, and an application 230.

The camera 201 includes a lens and an image sensor 2010 such as an imaging device. The visible light communication input control unit 210 includes a processor that includes a circuit such as a central processing unit (CPU). The processor executes a function of the visible light communication input control unit 210 in accordance with a predetermined application program stored in a memory. The input unit 220 is, for example, a touch panel disposed in the image display unit 221 or a button provided on the mobile terminal 200. The imaging processing unit 222 includes a circuit that converts light received by the image sensor 2010 into a signal and a circuit that operates the image sensor 2010. The visible light communication input control unit 210 may be configured of one semiconductor chip.

In response to the user's input, the input unit 220 issues a visible light communication request to the visible light communication input control unit 210. A decoding unit 211 in the visible light communication input control unit 210 issues an imaging request to the imaging processing unit 222 in response to this request. The imaging processing unit 222 receives a signal from the image sensor 2010 and transmits the signal to the decoding unit 211. The decoding unit 211 performs decoding based on the data and transmits the result to the application 230. The application 230 executes post-processing for decoding.

Figure 4:
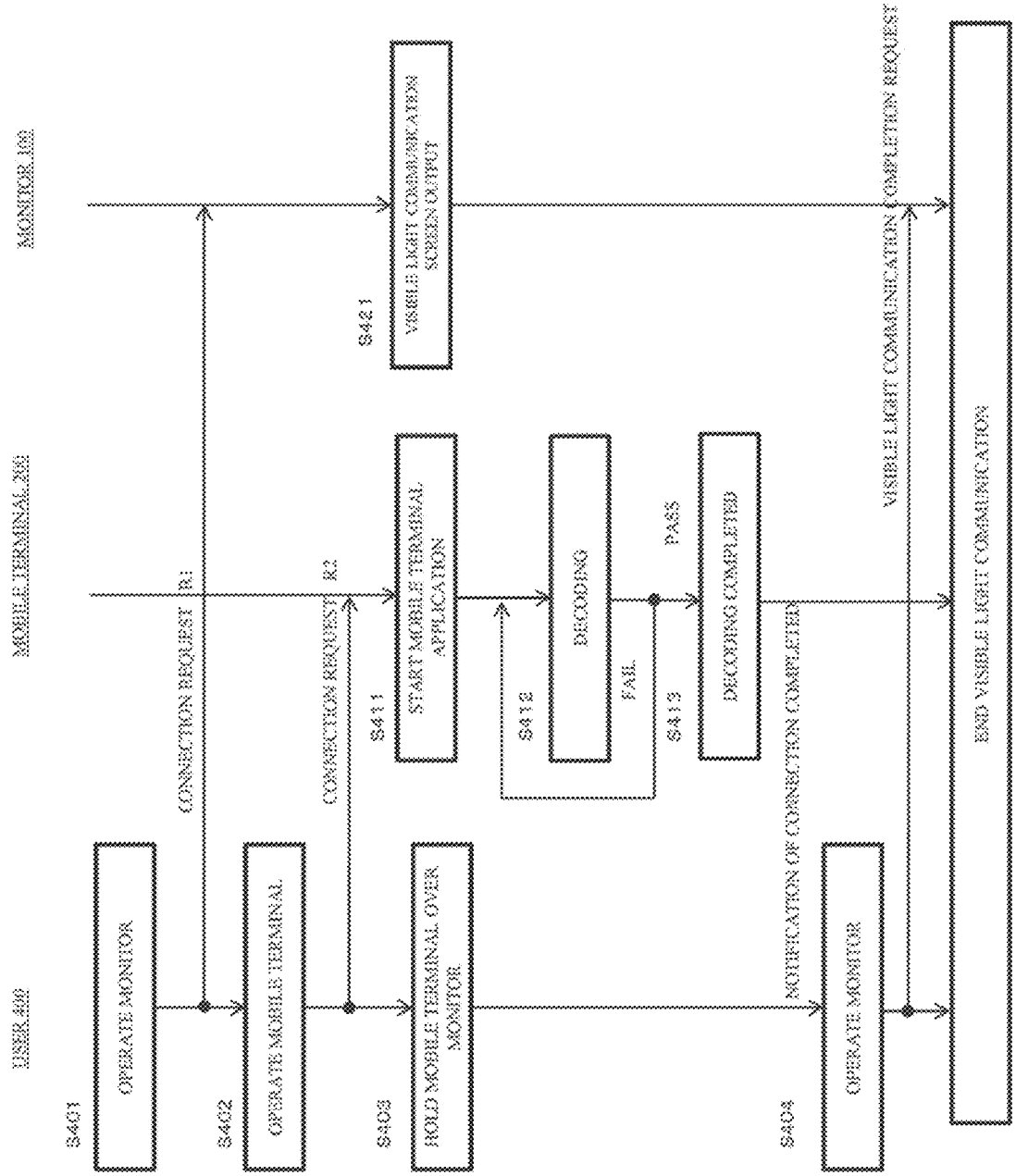
FIG. 4 is a conceptual diagram illustrating a time series of an operation of visible light communication.

These operations are illustrated in chronological order in FIG. 4. A user 400 performs an operation of the monitor 100 (S401) and issues a connection request R1 for visible light communication to the monitor 100. Having received the connection request R1, the monitor 100 transitions to step S421 to thereby output a visible light communication screen to the image display unit 121. Next, the user 400 executes a mobile terminal operation (S402) to issue a visible light communication connection request R2 to the mobile terminal 200. In response to this request, the mobile terminal 200 transitions to step S411, and activates the required application of the mobile terminal. Then, the mobile terminal 200 proceeds to step S412 and starts the decoding process.

It is to be noted that the order in which steps S401 and S402 are performed may be simultaneous or reversed.

When the application of the mobile terminal is activated, the user 400 holds the mobile terminal over the monitor (S403). When the decoding process is completed in the mobile terminal 200 (S413), the mobile terminal 200 displays that the connection is completed on the image display unit 221 of the mobile terminal. Upon receiving this notification, the user 400 performs monitor operation (S404) to thereby complete the visible light communication of the monitor 100 having received the visible light communication completion request. These operations allow the mobile terminal 200 and the monitor 100 to perform visible light communication.

As described above with reference to FIGS. 1 to 4, using the monitor 100 and the mobile terminal 200 makes it possible to transmit and receive data via visible light.

Figure 5:
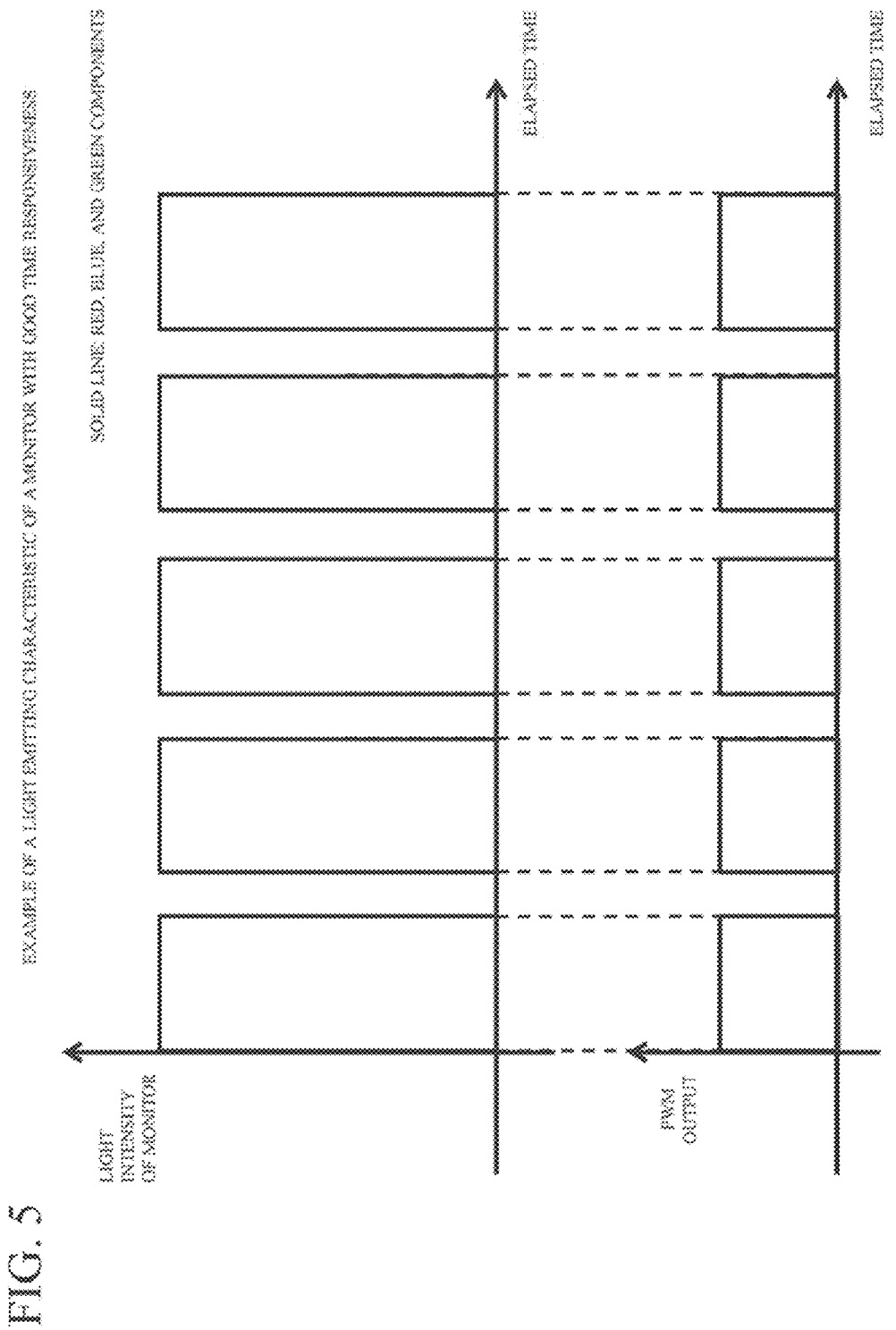
FIG. 5 is a diagram illustrating an example of a light emitting characteristic of a monitor with good time responsiveness.

Next, an example of a light emitting characteristic of a monitor with good time responsiveness will be described with reference to FIG. 5. The lower section of FIG. 5 illustrates a PWM (Pulse Width Modulation) signal input to the backlight unit 122, and the upper section of FIG. 5 illustrates a time-series change in the intensity of light that is actually emitted by the monitor 100 in response to the PWM signal. As illustrated in FIG. 5, in a monitor with good time responsiveness, all components of red (R), blue (B) and green (G) have sufficiently low light intensity in the PWM output off period, so that a high SN ratio can be obtained.

Figure 6:
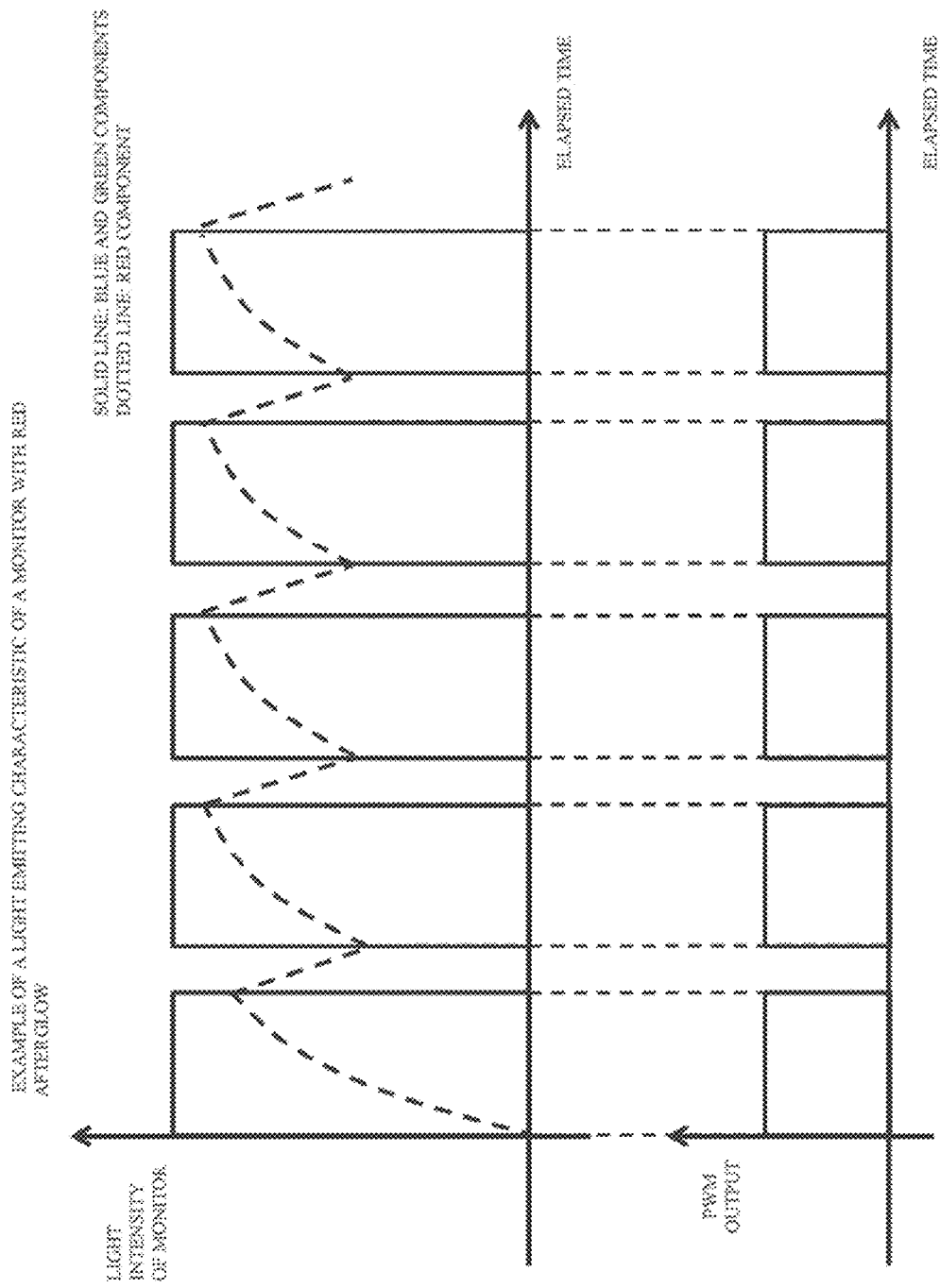
FIG. 6 is a diagram illustrating an example of a light emitting characteristic of a monitor with an afterglow of red light.

On the other hand, FIG. 6 illustrates an example of the light emitting characteristic of the monitor when there is an afterglow of red light. Similar to FIG. 5, a PWM signal inputted to the backlight unit 122 is illustrated in the lower section of FIG. 6 whereas a time-series change in the intensity of the light actually emitted by the monitor upon receiving the PWM signal is illustrated in the upper section of FIG. 6. As shown by the solid line in the figure, the output is close to zero in the PWM off period in the blue and green signals, while in the red component, light remains even in the PWM off period as shown by the dotted line. Therefore, it can be seen that the SN ratio of the signal is degraded. As a result, in a monitor where the afterglow of red light occurs long, the efficiency of visible light communication deteriorates, and in some cases, communication may not be established.

1.2 Embodiment Examples 1-2-1. Embodiment Example 1-1

Figure 7:
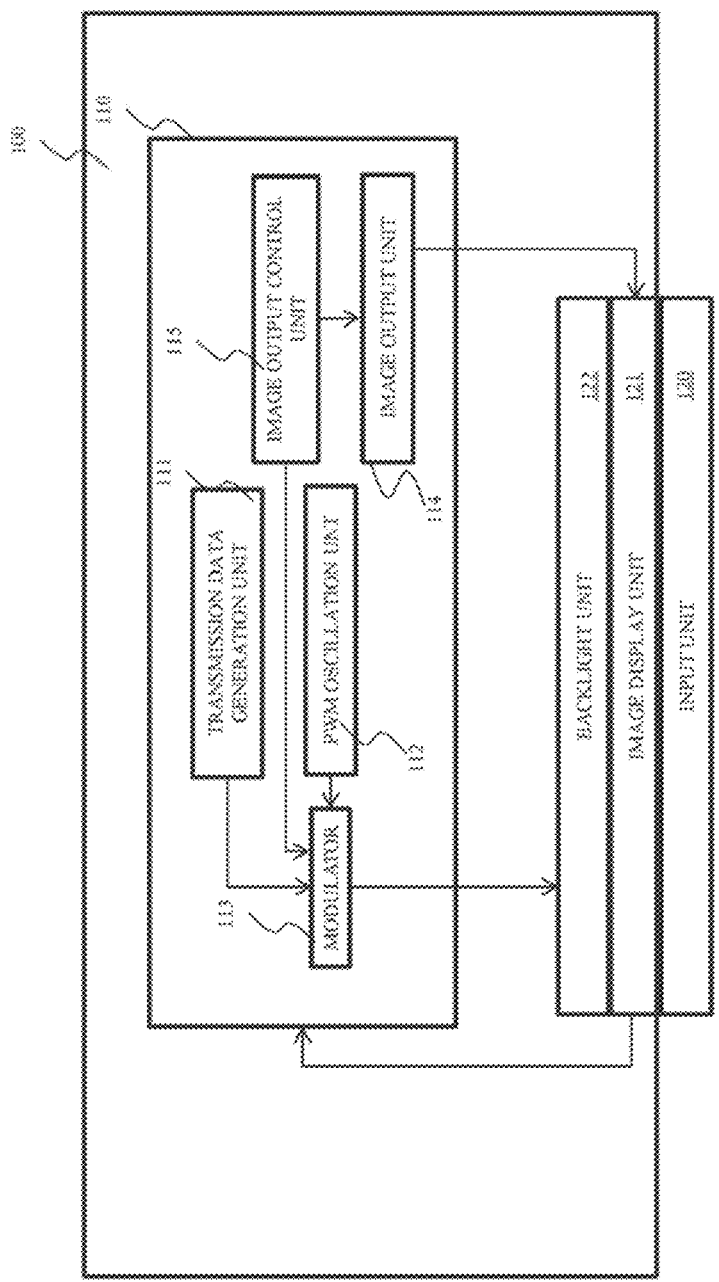
FIG. 7 is a block diagram illustrating a configuration of a monitor provided with an image output control unit according to a first exemplary embodiment.
Figure 9:
FIG. 9 shows a table illustrating an example of a red component characteristic for each image according to the first exemplary embodiment.

A configuration for solving such a problem will be described with reference to FIG. 7. In FIG. 7, by additionally providing an image output control unit 115 to the monitor 100 having the configuration illustrated in FIG. 2, the visible light communication output can be controlled. Note that the image output control unit 115 is a part of the visible light communication output control unit 110, and therefore the function thereof is executed by the processor according to the program stored in the memory.

In FIG. 7, the image output control unit 115 (an example of the image processing unit) controls the output of an image based on the information on the afterglow characteristic of the monitor 100. With a table Tb1 stored in the memory as illustrated in FIG. 8, the image output control unit 115 can confirm whether the monitor 100 has an afterglow characteristic or not by referring to the table Tb1. Here, the table Tb1 may be individually held by the monitor 100. Alternatively, the table Tb1 may be collectively held by a server (not shown) or the like to which the monitor 100 can be connected whereby notification is made to each monitor 100. Furthermore, the image output unit 114 holds information as to whether or not each image contains an R component as shown in a table Tb2 illustrated in FIG. 9. The combination of these two pieces of information allows the monitor 100 having afterglow characteristics to avoid displaying a red image.

Figure 10:
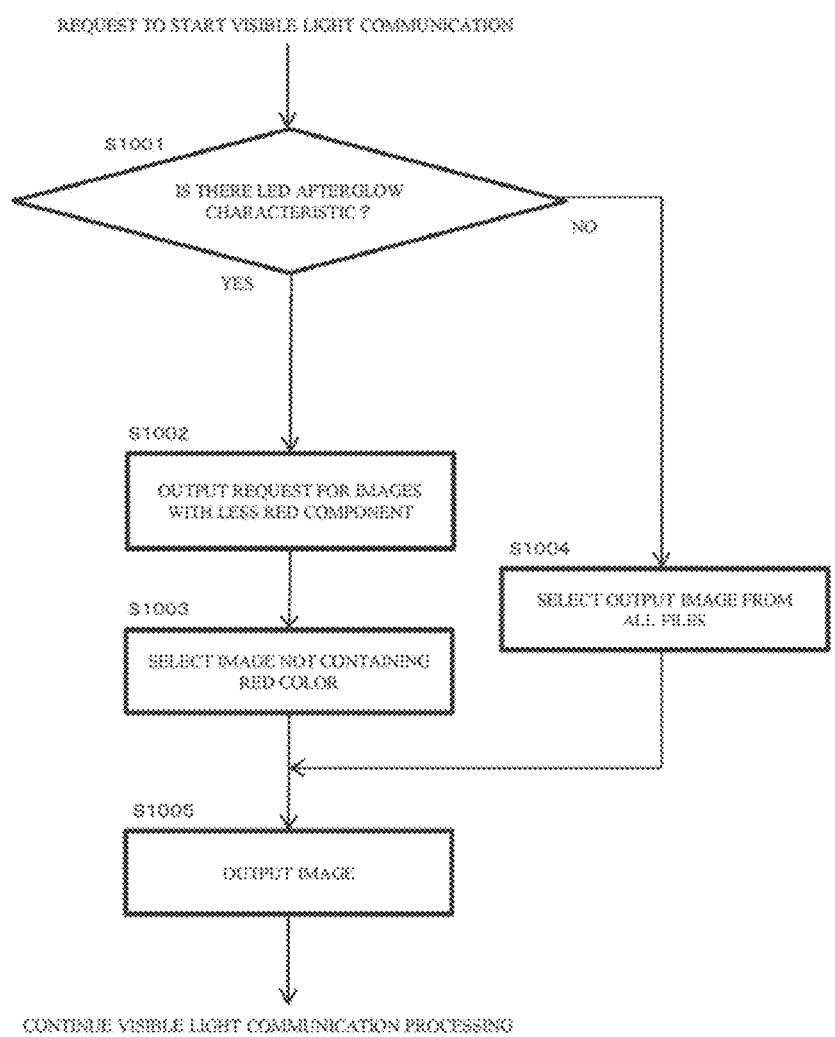
FIG. 10 is a flowchart illustrating an operation of the image output control unit according to the first exemplary embodiment.

A specific operation flow of the monitor 100 will be described with reference to FIG. 10. When a visible light communication start request is issued, the image output control unit 115 transitions to the state of step S1001 and, using the table Tb1, determines whether or not the monitor 100 has the LED afterglow characteristic. If determination is made that afterglow is present, the process proceeds to step S1002, and the image output control unit 115 issues a request to the image output unit 114 to select an image in which the R component is limited. The image output unit 114 transitions to step S1003, and uses the table Tb2 to select an image not including a red component, for example, the images D, E, and F. On the other hand, when determination is made in step S1001 that there is no afterglow characteristic, the image output control unit 115 causes the image output unit 114 to select an output image from all the images in step S1004. Thereafter, the process proceeds to step S1005 and the image output unit 114 outputs the selected image.

1-2-2. Embodiment Example 1-2

Figure 11:
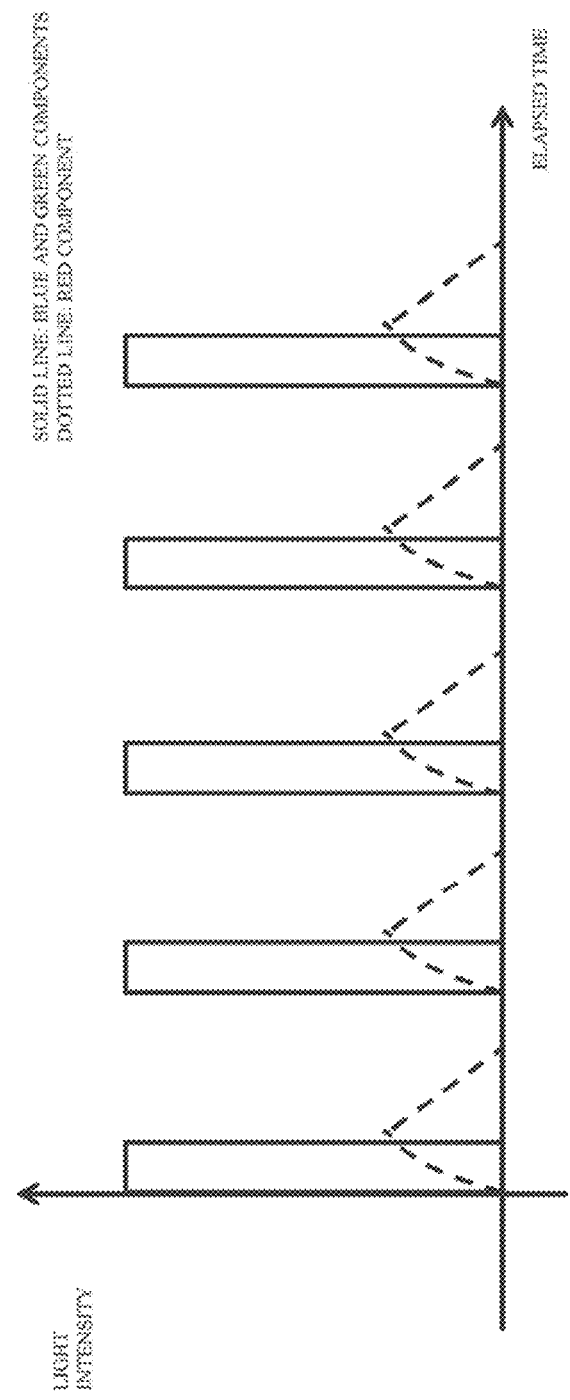
FIG. 11 is a diagram illustrating an example of a light emitting characteristic as a countermeasure to the red afterglow effect by changing the duty ratio according to the first exemplary embodiment.
Figure 12:
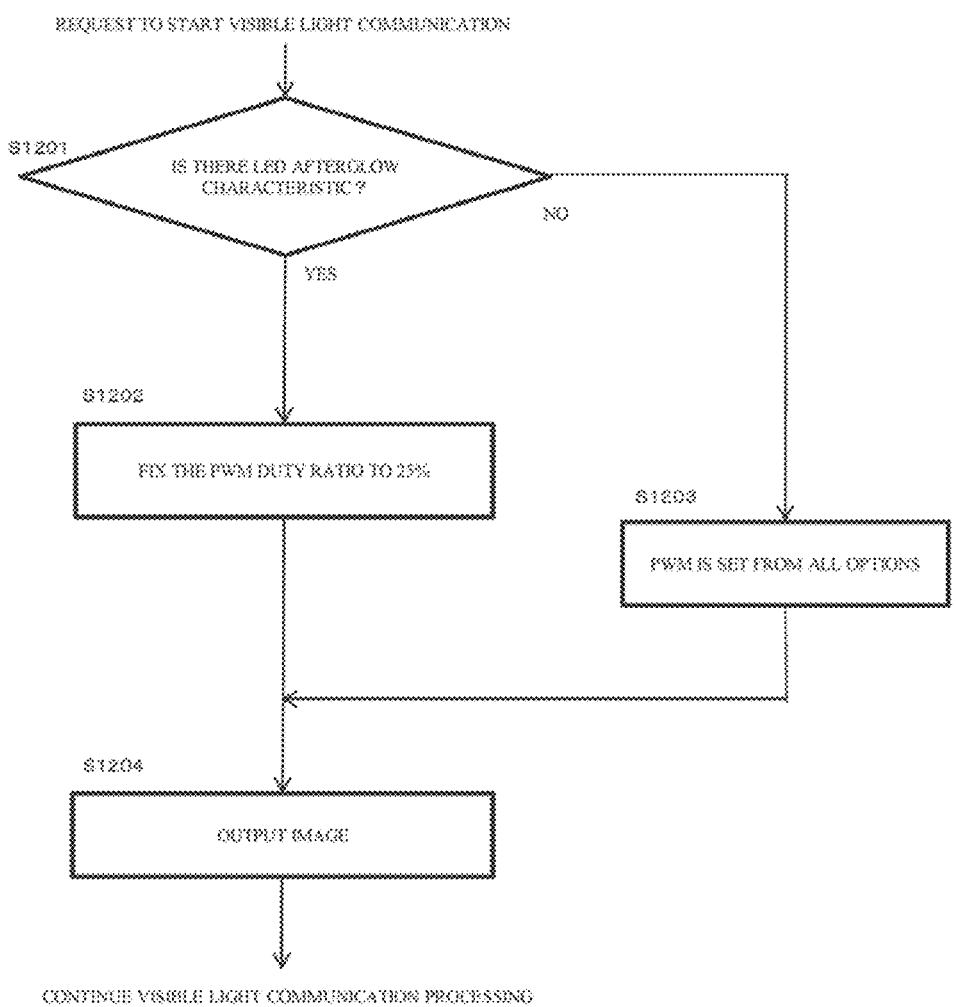
FIG. 12 is a flowchart illustrating an operation of a modulator according to the first exemplary embodiment.

FIG. 11 and FIG. 12 illustrate a method of reducing the influence of the afterglow of red light by changing the duty ratio of PWM.

As illustrated in FIG. 6, since the afterglow component in the monitor 100 remains in the OFF period of the PWM signal, the mobile terminal 200 fails in the determination of 0 or 1 to thereby deteriorate communication efficiency. Therefore, as illustrated in FIG. 11, by reducing the duty ratio of the PWM, the afterglow component can be made smaller as compared to when the duty ratio is larger. Consequently, errors in the determination of 0 and 1 can be reduced, and as a result communication efficiency is improved.

A specific operation flow will be described with reference to FIG. 12. When a visible light communication request is issued, the image output control unit 115 transitions to the state of step S1201 and, using the table Tb1 and determines whether or not the monitor 100 has the LED afterglow characteristic. If determination is made that the afterglow characteristic is present, the image output control unit 115 transitions to step S1202 and issues a request to the modulator 113 to set a low duty ratio, for example, a fixed 25%. On the other hand, when determination is made in step S1201 that there is no presence of the afterglow characteristic, the process proceeds to step S1203 and PWM is set from the duty ratio of all the options. Thereafter, the process proceeds to step S1204 and an image is output at the selected duty ratio. However, it is important to note that with this method the screen brightness may not be brightened or that the possibility of flickering increases.

1-2-3. Embodiment Example 1-3

Figure 13:
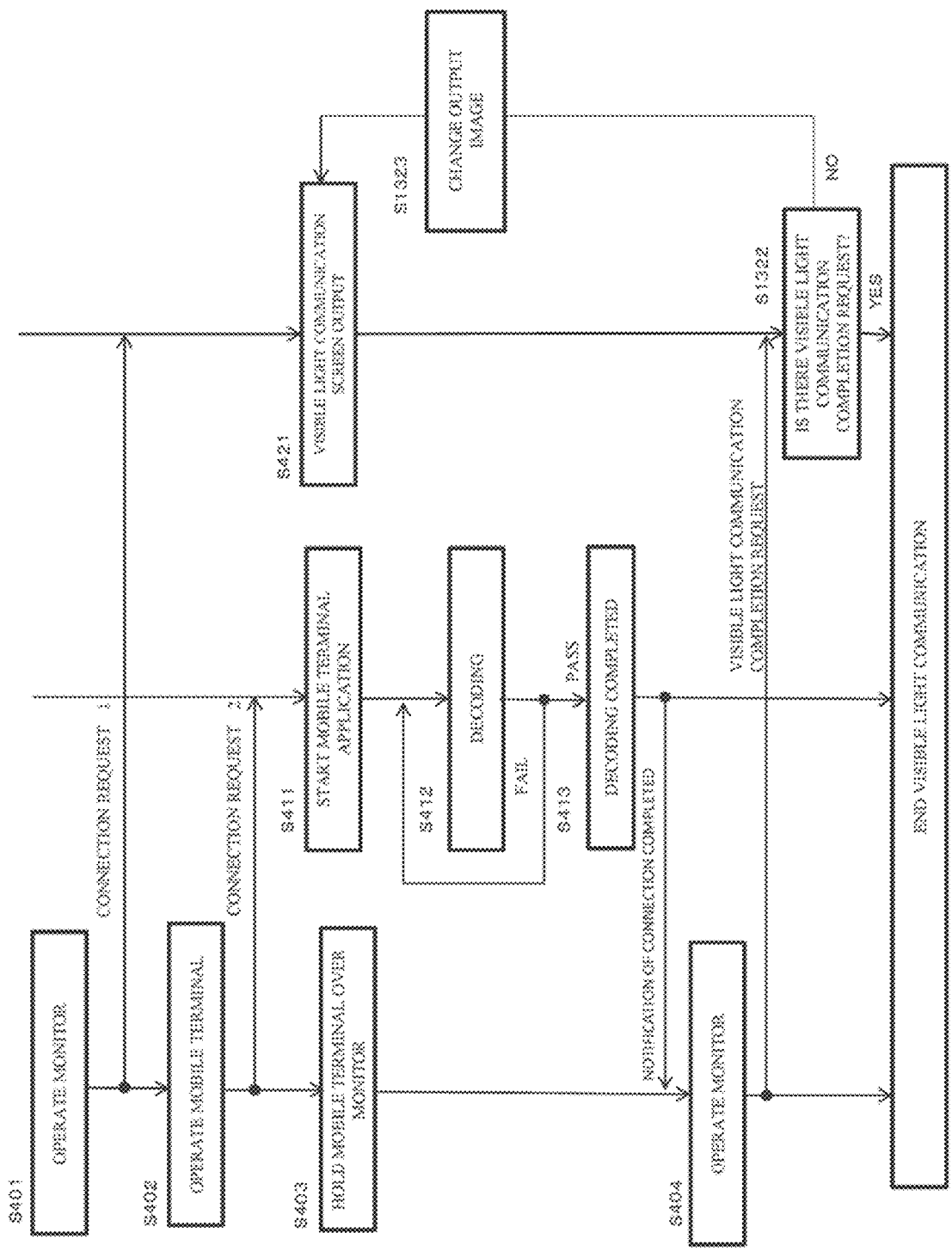
FIG. 13 is a flowchart of a timeout method according to the first exemplary embodiment.

If the afterglow characteristic of the monitor 100 is unknown, the image may be dynamically switched. FIG. 13 illustrates a method of changing the output image of the monitor 100 by self-determination of the monitor 100 using time-out. In addition to the normal operation illustrated in FIG. 4, in FIG. 13, the monitor 100 periodically determines in step S1322 whether or not there is a visible light communication completion request. When the visible light communication completion request is made in the operation of the monitor 100 by the user 400, the LID (light ID signal) is terminated as in the normal operation. On the other hand, when there is no visible light communication completion request, the monitor 100 transitions to the state of step S1323. In step S1323, the image output control unit 115 causes the image output unit 114 to reselect an image with less red components as an output image. Thereafter, the process returns to step S421 to re-output the visible light communication screen. With this configuration, it is possible to solve the problem of afterglow by changing the output image when visible light communication is not established due to the influence of afterglow while initially using an image without color limitation.

1-2-4. Embodiment Example 1-4

Figure 14:
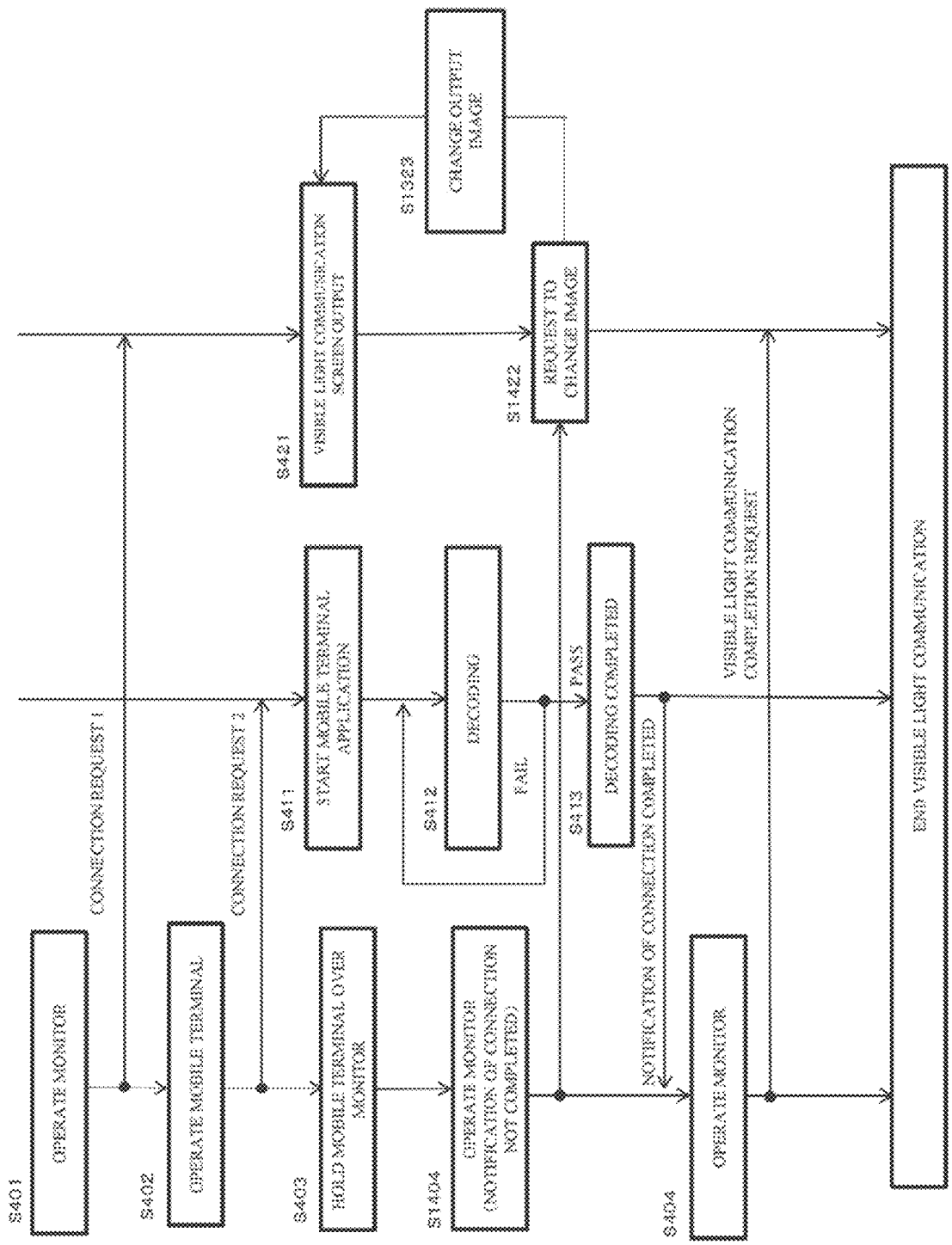
FIG. 14 is a flowchart of a user request method according to the first exemplary embodiment.
Figure 15:
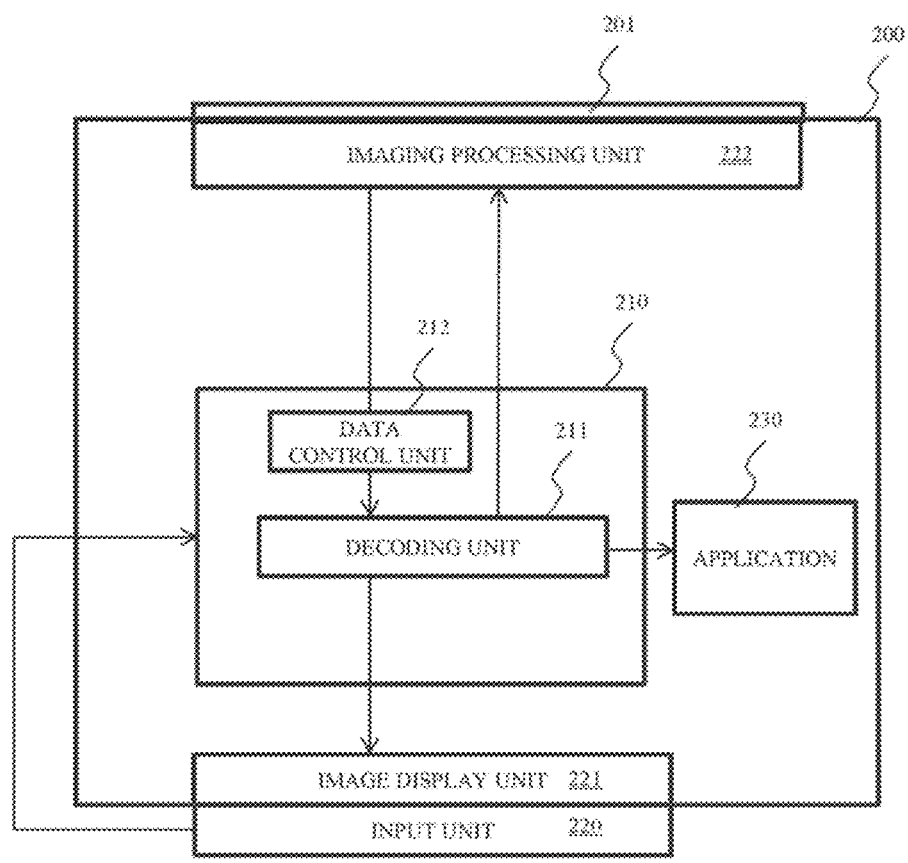
FIG. 15 is a block diagram illustrating a configuration of a mobile terminal provided with a data control unit according to a second exemplary embodiment.

In addition, FIG. 14 illustrates a method in which the user notifies that the connection is incomplete when the visible light communication is not completed. Like the case in FIG. 13 as well, in the case of FIG. 14, the monitor 100 sets an image as an image without color limitation immediately after the visible light communication connection request. A notification of incomplete connection is given by the operation of the monitor 100 by the user (S1404), and in response to this, the image output control unit 115 of the monitor 100 requests the image output unit 114 to change the image (S1422). As a result, every time the output image is changed (S1323), the monitor 100 changes the image to an image with little afterglow, specifically, an image with little red component, whereby the deterioration of the communication efficiency due to the afterglow can be reduced. Through these processes, while initially using an image having no color limitation, it is possible to change the output image only when the visible light communication is not established due to the influence of the afterglow.

1.3 Features and Other Benefits

The monitor 100, the system 1 including the monitor 100 and the mobile terminal 200, or the visible light communication method using the monitor 100 according to the second embodiment is capable of reducing the influence of a color component that causes an afterglow effect from the output image of the monitor 100 by statically or dynamically selecting an image to be displayed on the monitor 100 even if the monitor 100 has the red afterglow characteristic. This makes it possible to achieve efficient visible light communication without any special handling on the mobile terminal 200 side.

Note that although reducing the influence of the red afterglow is described here, it is obvious that the present disclosure can also apply to the afterglow of blue or green color and a similar measure can be taken as well by controlling to reduce the influence of the corresponding color components.

Further, in FIG. 13 and FIG. 14, the dynamic image changing method based on FIG. 11 has been described. A similar dynamic control can be made as well in changing the PWM duty ratio based on FIG. 12.

2. Exemplary Embodiment 2

A visible light communication device according to a second exemplary embodiment will be described below with reference to FIGS. 15 to 19.

2-1. Configuration and Operation

A basic configuration and an operation of the visible light communication device according to the second exemplary embodiment are the same as those according to the first exemplary embodiment, and therefore are denoted with the same reference numerals and the descriptions thereof are omitted. The visible light communication input control unit 210 includes a processor including a circuit such as a central processing unit (CPU). The processor executes the functions of a data control unit 212 and a decoding unit 211 (to be described later) according to a program of the application 230 stored in a memory.

2-2. Embodiment Examples

2-2-1. Embodiment Example 2-1

Figure 16:
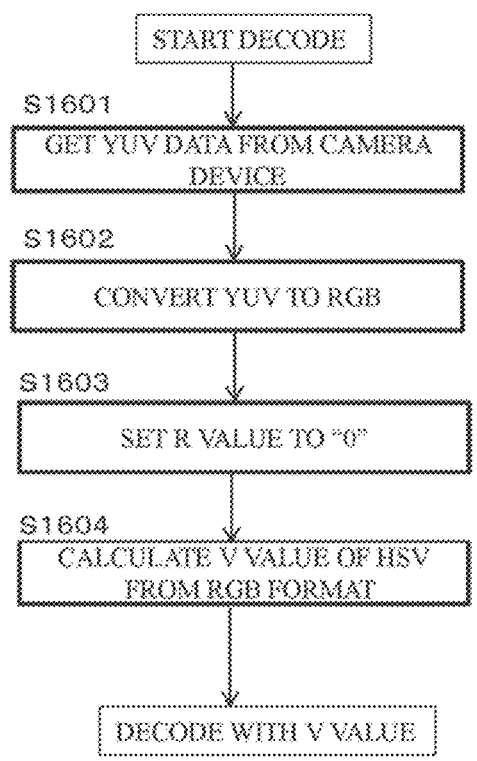
FIG. 16 is a flowchart illustrating a process of the data control unit according to the second exemplary embodiment.

In the second exemplary embodiment, the mobile terminal 200 further includes the data control unit 212. The data control unit 212 (an example of the image processing unit) controls the imaging data received from the imaging processing unit 222 and eliminates the influence of the red component. An example of this specific method is illustrated in FIG. 16.

When the user operates the input unit 220 of the mobile terminal and the start of decoding is requested through, for example, an execution of the application 230, the decoding unit 211 requests the imaging processing unit 222 to start imaging, and the data control unit 212 receives the data (S1601). For example, if the data received is in YUV format, the data is converted to RGB format (S1602). Next, in the converted RGB format, zero is assigned to the value of R (S1603). Thereafter, for example, the data is converted into HSV format (S1604) and transmitted to the decoding unit 211 enabling visible light communication decoding processing to be performed based on the luminance information. The decoding unit 211 reads predetermined information from a visible light communication signal. The read information is displayed on the image display unit 221.

It is to be noted that when the data format received from the imaging processing unit 222 is in the RGB format, performing the steps of S1601 and S1602 are not necessary but just setting the R value to zero in step S1603 is sufficient.

2-2-2. Embodiment Example 2-2

Figure 17:
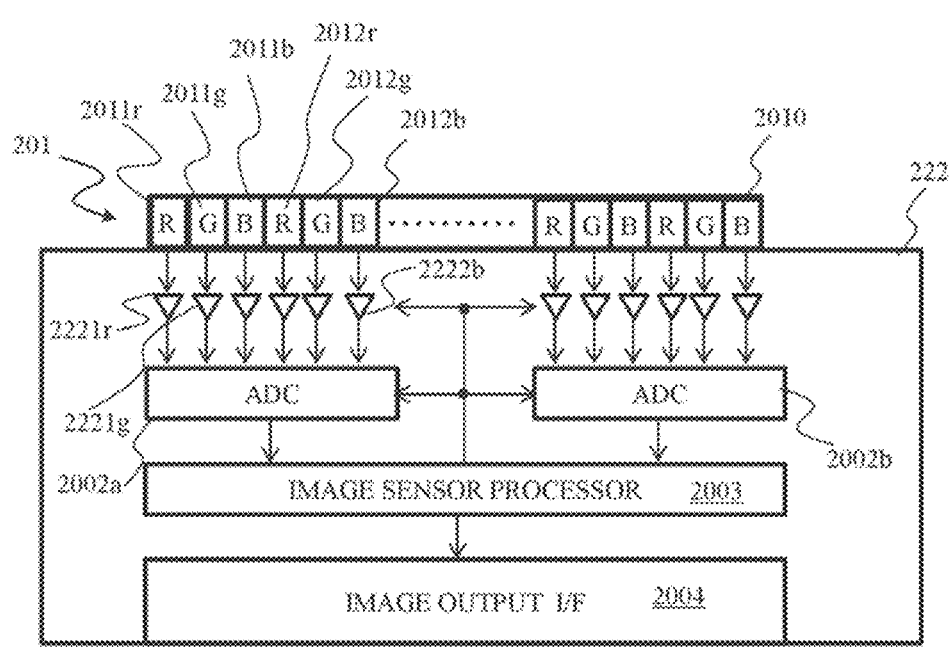
FIG. 17 is a block diagram illustrating details of an imaging processing unit according to the second exemplary embodiment.

Next, an example of a process to reduce the R component using the imaging processing unit 222 will be described with reference to FIG. 17. FIG. 17 is a block diagram illustrating an internal configuration of the imaging processing unit 222 (an example of the image processing unit). The camera 201 (an example of the image acquisition unit or an imaging unit) includes a lens (not shown) and normally a plurality of sensors constituting an image sensor. The image sensor 2010 includes, for example, red sensors 2011r, 2012r, . . . , green sensors 2011g, 2012g, . . . , and blue sensors 2011b, 2012b, . . . . Each sensor is provided with a corresponding amplifier 2221r . . . , 2221g . . . , and 2222b . . . . Analog-to-digital converters (ADC) 2002a and 2002b are provided next to the amplifiers. Note that although FIG. 17 illustrates a configuration in which one ADC performs conversion of a plurality of amplifiers by time division multiplexing, the configuration is not limited thereto. An image sensor processor 2003 receives data from the ADCs 2002a and 2002b, performs operations such as format conversion, and transmits the data to the visible light communication input control unit 210 through an image output I/F 2004.

In order to eliminate the red component, for example, a method in which the sensors 2011r, 2012r, . . . are not physically mounted may be considered. However, in this case, the image sensor cannot be used as a normal camera. As another method, it is conceivable to turn off the operation of the amplifiers 2221r, . . . that correspond to the red sensors. Alternatively, a method of limiting the operation of the sensors may be used, such as the analog-to-digital converters 2002a and 2002b not performing ADC conversion at the timing corresponding to the R component or setting a zero thereto. These methods can be generally realized by changing the settings through the image sensor processor 2003. Furthermore, in the image sensor processor 2003, only the R component may be zeroed before the format conversion. When using the RGB format, it is also possible to set the R component to zero after format conversion. As described above, setting the red component to zero in the imaging processing unit 222 enables the influence of the afterglow of red light to be avoided while the visible light communication input control unit 210 (refer to FIG. 15) performs the normal visible light communication processing.

2-2-3. Embodiment Example 2-3

Figure 18:
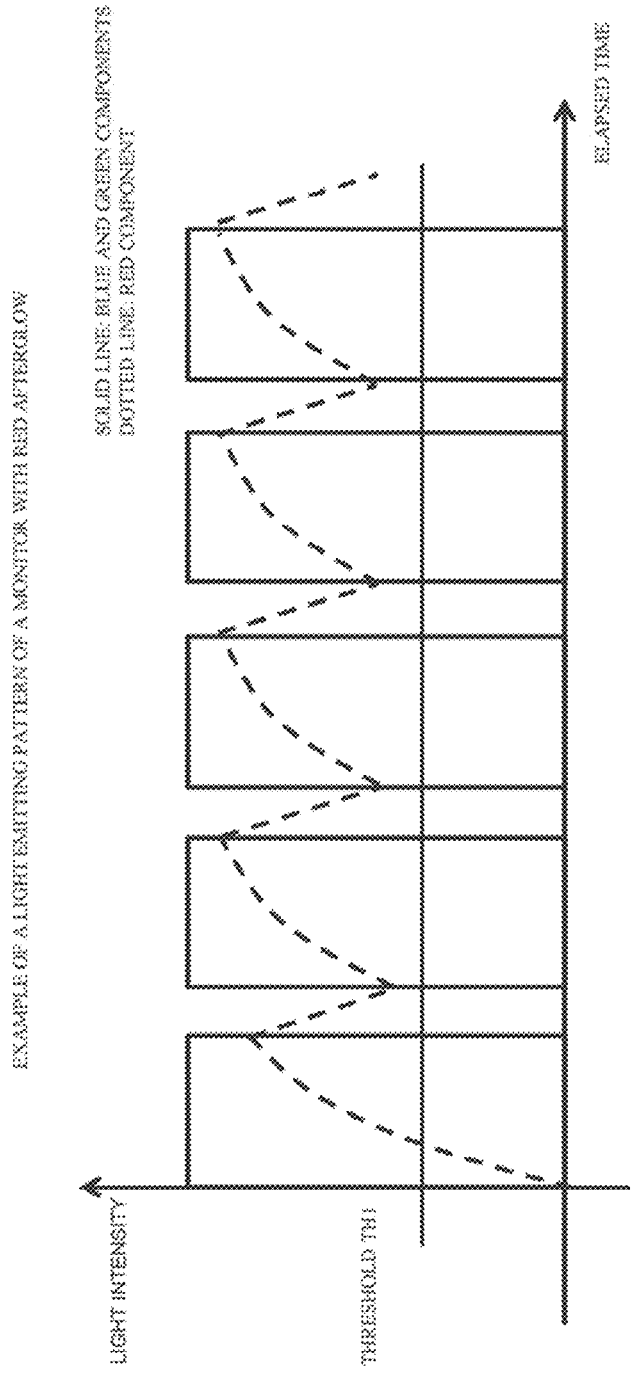
FIG. 18 is a diagram illustrating an example of a light emitting characteristic showing the relationship between a first threshold and the light intensity according to the second exemplary embodiment.
Figure 19:
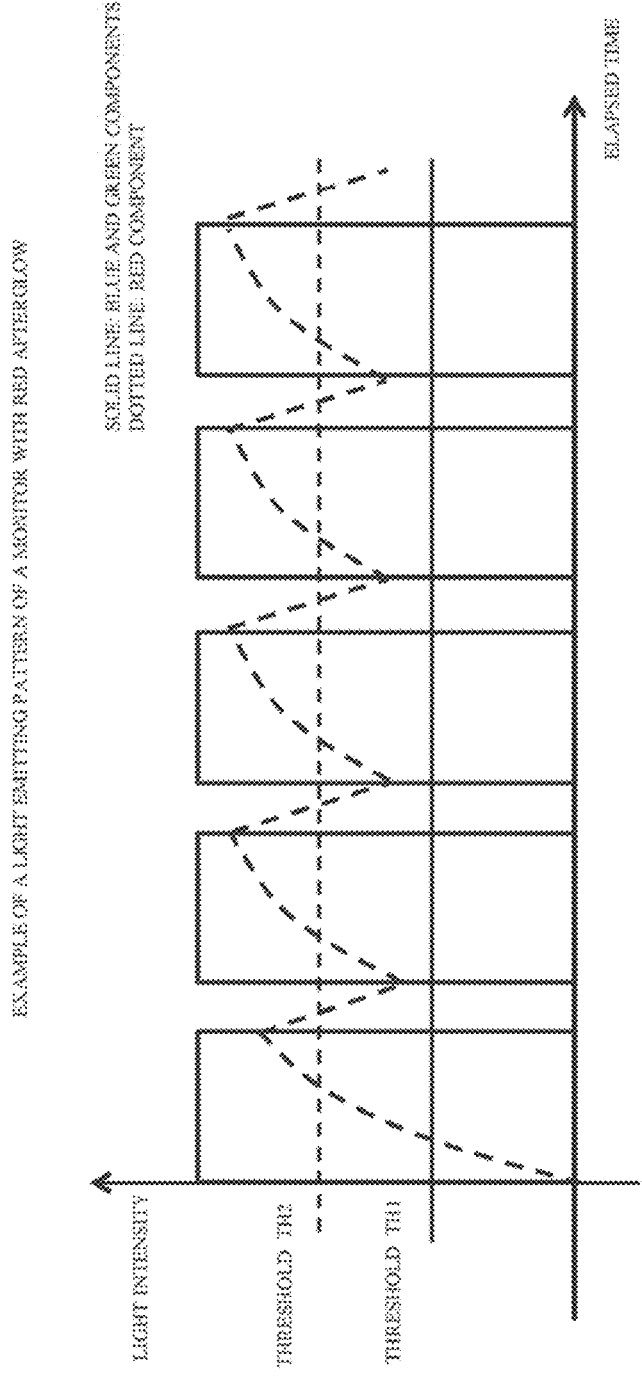
FIG. 19 is a diagram illustrating an example of a light emitting characteristic showing the relationship between a second threshold and the light intensity according to the second exemplary embodiment.

In the above method, the R component being limited in the mobile terminal 200 causes rise to another problem in which transmission and reception of data fails when the output image of the monitor 100 is composed of only the R component. In order to solve this problem, it is also conceivable to set a second threshold for decoding the R component FIG. 18 is a diagram illustrating a relationship between the light intensity of a monitor in a normal operation and a first threshold Th1. By using the first threshold value Th1, it is possible to correctly determine 0 and 1 for the B component and the G component, but 1 is always determined for the R component. In this case, assume that red color is also emitted similarly to the B component and the G component, and as illustrated in FIG. 19, a second threshold Th2 suitable for the R component may be dynamically set based on the 0 and 1 determination timings of the B component and the G component. Thus, continuous decoding is possible even after an image in which the R component (red component) is dominant is output.

2-3. Features and Other Benefits

The mobile terminal 200, the system 1 including the monitor 100 and the mobile terminal 200, or the visible light communication method using the mobile terminal 200 according to the second embodiment is capable of decoding the visible light communication signal after reducing the color components that cause the afterglow effect from the acquired image signal even if the monitor 100 has the red afterglow characteristic. This makes it possible to achieve efficient visible light communication without any special handling on the monitor 100 side.

Note that although the case of reducing the influence of the red afterglow is also described here, it is obvious that the present disclosure can also apply to the afterglow of blue or green color and a similar measure can be taken as well by controlling to reduce the influence of the corresponding color components.

3. Exemplary Embodiment 3

A visible light communication device according to a third exemplary embodiment will be described below with reference to FIGS. 20 to 27.

3-1. Configuration and Operation

A basic configuration and an operation of the visible light communication device according to the third exemplary embodiment are the same as those according to the first and second exemplary embodiments, and therefore are denoted with the same reference numerals and the descriptions thereof are omitted.

3-2. Embodiment Examples

3-2-1. Embodiment Example 3-1

When the method of limiting the R component in the mobile terminal 200 described in the second exemplary embodiment is employed, there arises a problem that data transmission and reception fails if the output image to the monitor 100 is composed of only the red component. In order to solve this problem, a communication image area for displaying components other than the red component may be provided in the output image to the monitor 100.

Figure 20:
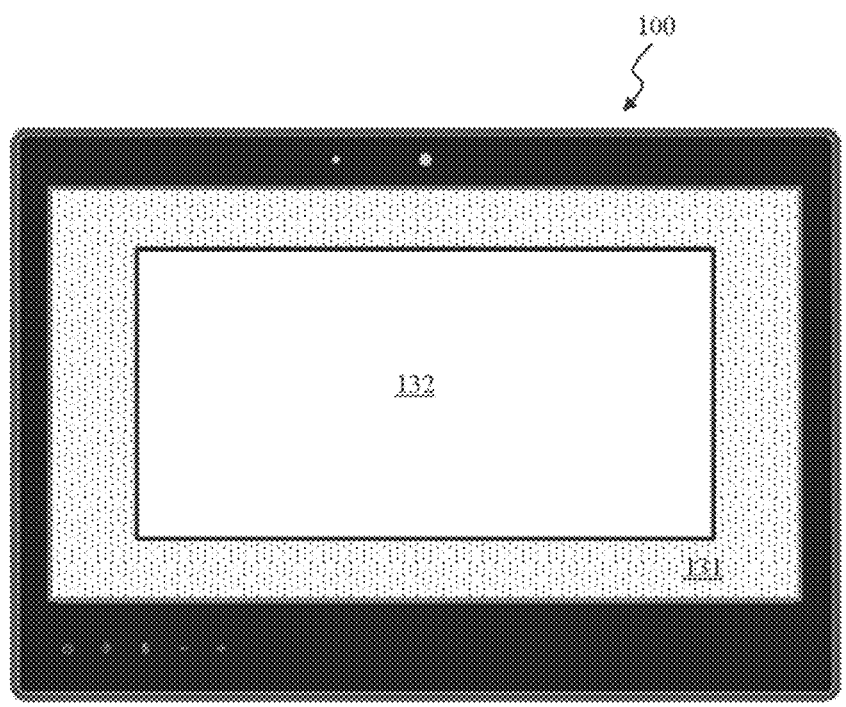
FIG. 20 is a conceptual diagram illustrating a monitor provided with a communication image area according to a third exemplary embodiment.

As illustrated in FIG. 20, an image display area of the monitor 100 includes a frame shape communication image area 131 surrounding the periphery of the image display area and a normal image area 132 in which free image arrangement is possible. An image including the B component or the G component is displayed in the communication image area 131. As a result, visible light communication can be realized even when the normal image area 132 is composed of only the R component. Note that the communication image area 131 may have any color such as white or magenta as long as the B component or the G component is included therein.

Figure 21A:
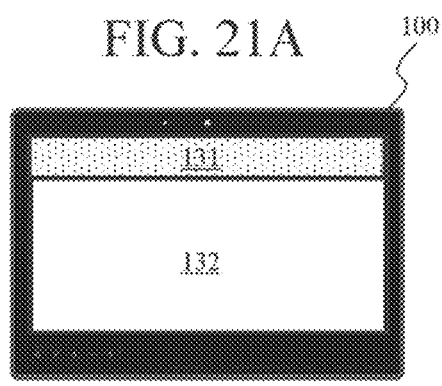
FIGS. 21A to 21D are conceptual diagrams illustrating examples of a pattern of the communication image area according to the third exemplary embodiment.
Figure 21B:
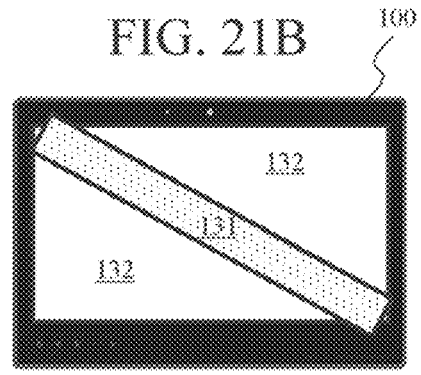
Figure 21C:
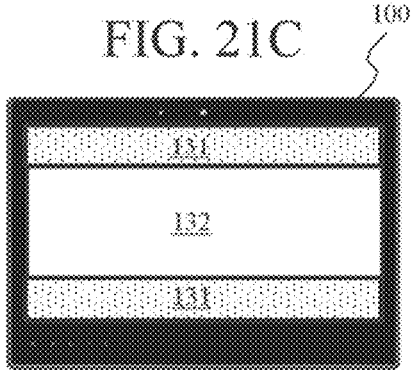
Figure 21D:
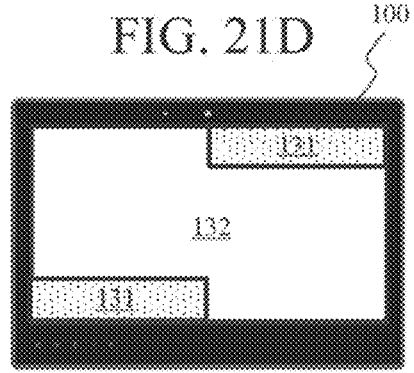

The communication image area 131 may have a shape other than the frame shape as long as the size thereof is of a certain size or more. Examples of this pattern are illustrated in FIGS. 21A to 21D. FIG. 21A is an example in which the communication image area 131 is displayed in a bar shape. It should be noted that although the bar in this example is shown at the top, the bar may be disposed anywhere, such as in the middle, bottom, or side. Further, the communication image area 131 may be arranged obliquely as illustrated in FIG. 21B. In addition, as illustrated in FIG. 21C, the communication image area 131 may be displayed in a bar shape on both the top and bottom sides. As illustrated in FIG. 21D, the communication image area 131 may include multiple short bars that are disposed facing each other diagonally in the vertical direction whereby the communication image area 131 is effectively included in the entire area along the lateral direction. As described above, arranging an image which includes the B component or the G component in the lateral direction in the image allows visible light communication to be performed regardless of the display image of the normal image region 132. This method is also very effective in the case of performing visible light communication while displaying contents such as a moving picture with difficulty in image characteristic management, for example, a movie with many dark scenes. Here, it is experimentally known that the size of the communication image area 131 is desirably, for example, about 40% or more with respect to the total display area.

As described above, other than adding an image spatially containing the B component or the G component, an image containing the B component or the G component may be added time-divisionally. Specifically, visible light communication can be performed without being noticed by the user by displaying an image containing the B component or the G component once in several frames. Further, the communication image area 131 may be provided only while performing visible light communication.

3-2-2. Embodiment Example 3-2

Figure 22:
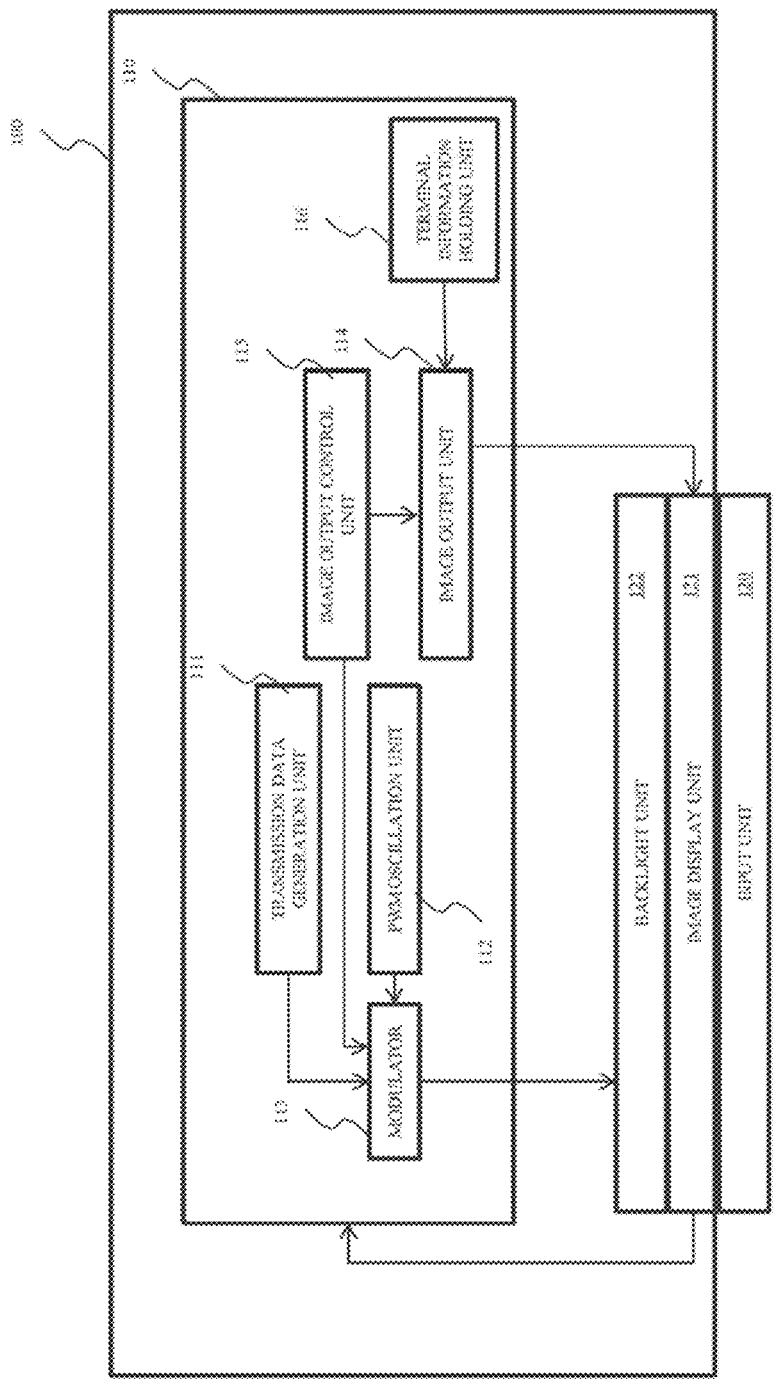
FIG. 22 is a block diagram illustrating a monitor provided with a terminal information holding unit according to the third exemplary embodiment.
Figure 23:
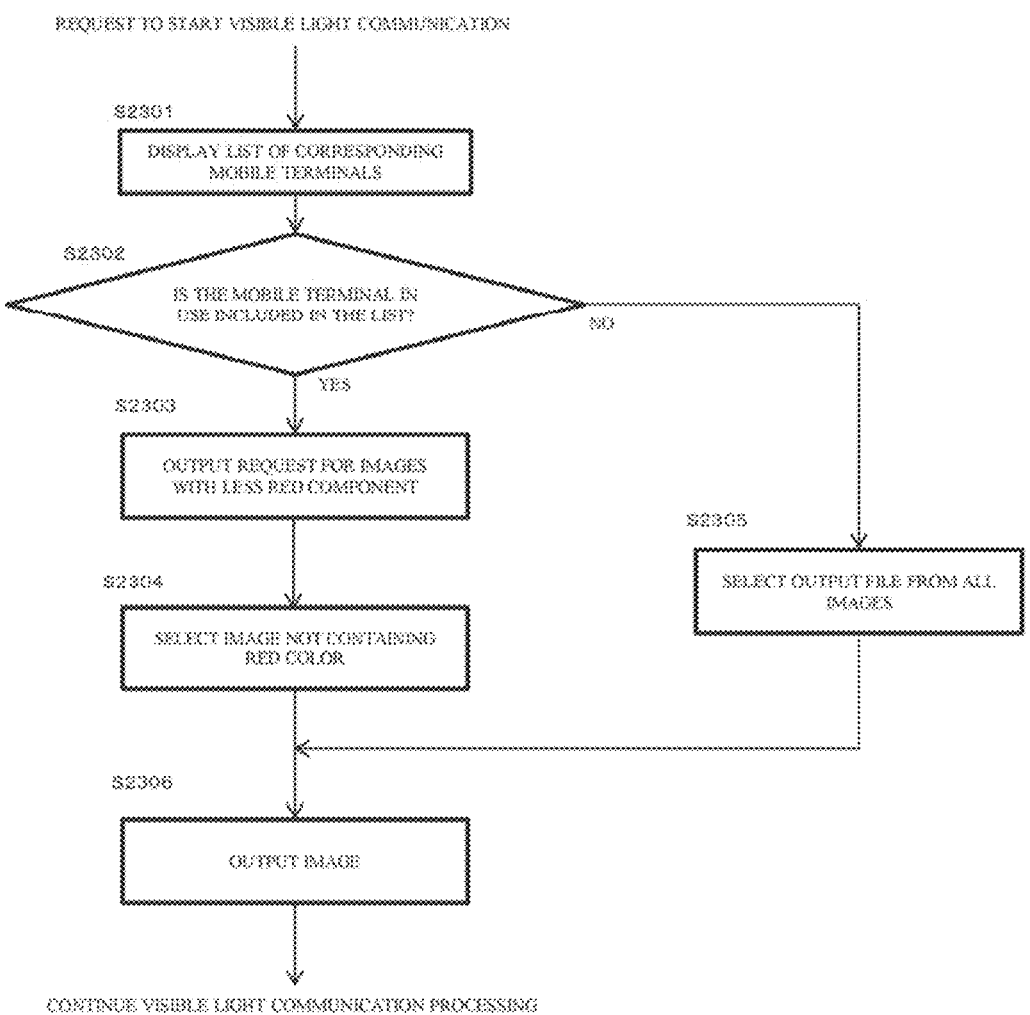
FIG. 23 is a flowchart illustrating a process using terminal information according to the third exemplary embodiment.

Whether the afterglow of a specific color component is detected or not is also affected by the frequency characteristics of the camera 201 mounted on the mobile terminal 200. Therefore, there are also cases where normal data communication may be performed depending on the type of camera 201 even if the same type of monitor 100 is used. With reference to FIGS. 22 and 23, a method of taking measures for afterglow using the user's terminal information will be described.

FIG. 22 is a diagram illustrating the monitor 100 additionally provided with a terminal information holding unit 116. The terminal information holding unit 116 is provided in a memory and stores a list of the mobile terminals 200 in which the afterglow problem occurs. The input unit 120 is an interface for the user to input information to the monitor 100 as in the first and second exemplary embodiments, and is, for example, a touch panel or a keyboard.

A specific operation in this exemplary embodiment is illustrated in FIG. 23. When a visible light communication start request occurs, the monitor 100 transitions to step S2301 and displays the terminal list of the terminal information holding unit 116 on the image display unit 121. The user notifies the monitor 100 through the input unit 120 by inputting a "Yes" or "No" depending on whether or not the corresponding terminal is used (S2302). If the user's notification is "Yes", the monitor 100 transitions to step S2303 and outputs an image with a small R component. If the user's notification is "No", the process proceeds to step S2305 where an image can be freely selected without performing image limitation whereby the visible light communication process can be continued since the terminal is one where communication failure does not occur even if there is a monitor output of the R component. The monitor 100 outputs the image selected in step S2304 or step S2305 (S2306)

3-2-3. Embodiment Example 3-3

An example in which the monitor 100 and the mobile terminal 200 are wirelessly paired after completion of visible light communication will be described with reference to FIG. 24. The monitor 100 includes a wireless unit 301*a*, and the mobile terminal 200 includes a wireless unit 301*b*, respectively. In this configuration, wireless pairing information is transmitted and received by visible light communication as the first step, and wireless pairing is performed based on the wireless pairing information as the second step. At this time, by exchanging time information through the established wireless pairing, it is possible to learn the configuration of an efficient visible light communication.

3-2-4. Embodiment Example 3-4

Figure 25:
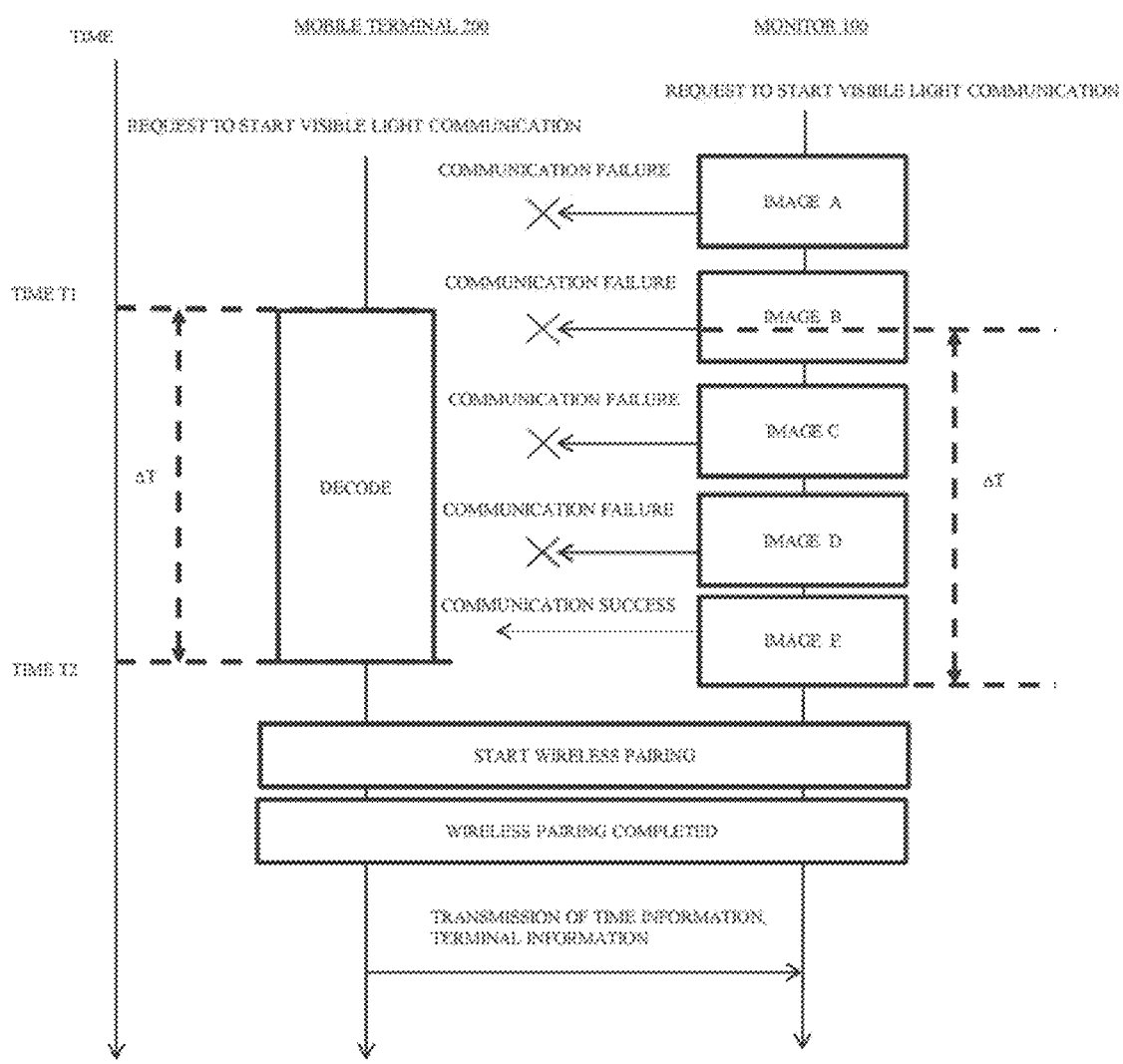
FIG. 25 is a schematic diagram illustrating an outline of a learning operation according to the third exemplary embodiment.

FIG. 25 is a diagram illustrating an operation flow for learning. After the request to start visible light communication, the mobile terminal 200 starts decoding at time T1. Thereafter, decoding is completed at time T2 and wireless pairing is started. Meanwhile, the monitor 100 receives the visible light communication request at approximately the same time and sequentially outputs images starting from image A for visible light communication and at the output of image E, visible light communication is successful. The decoding start time T1, the decoding end time T2, or a decoding time ΔT is transmitted to the monitor 100 together with the terminal information after the completion of the wireless pairing. As a result, it can be seen on the monitor 100 side that the images output during ΔT prior to the image E, that is, the images B to D and the combination of the mobile terminal 200 and the monitor 100 have poor compatible and communication is thus not stable. By utilizing these pieces of information, the monitor 100 is capable of learning a suitable combination of the mobile terminal 200 with the output image, storing and updating the information in the terminal information holding unit 116 of the monitor 100. An example of data stored in the terminal information holding unit 116 (refer to FIG. 22) is illustrated in FIG. 26.

Figure 24:
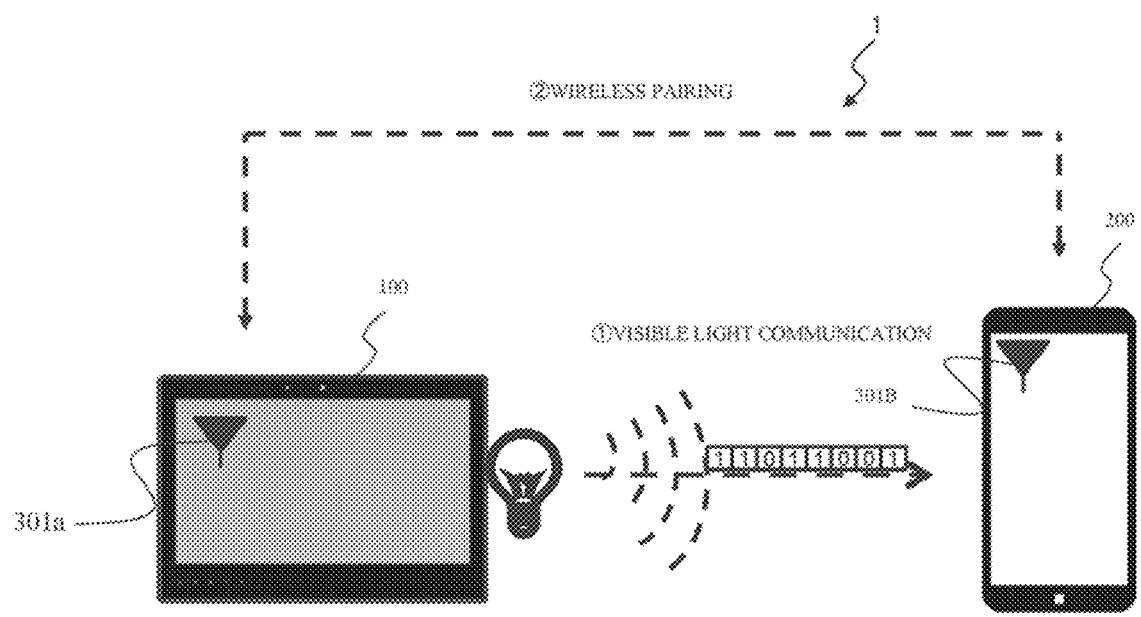
FIG. 24 is a schematic diagram illustrating an outline of a wireless pairing according to the third exemplary embodiment.

Here, in the example of FIG. 24, the monitor itself is configured to include the wireless unit; however, a configuration may be adopted in which the monitor 100 is connected by wire and be paired with the mobile terminal 200 via an access point or the like of the wired connection.

Note that if the image is a moving image, whether to decode or not may be recorded for each predetermined frame period using a time stamp and may be stored as information as shown in FIG. 26.

3-2-5. Embodiment Example 3-5

FIG. 27 is a schematic diagram illustrating a state in which a plurality of monitors 100A to 100F are connected to a server 302. For example, in the case of an aircraft, monitors 100A to 100F are installed in the plurality of seats 3A to 3F respectively and the monitors 100A to 100F thereof are connected to the server 302. In such a case, the learning information described with reference to FIGS. 24 to 26 can be shared among the plurality of monitors whereby an even more efficient optimization can be performed.

3-3. Features and Other Benefits

The monitor 100, the system 1 including the monitor 100 and the mobile terminal 200, or the visible light communication method using the monitor 100 according to the third embodiment is capable of eliminating the influence of a color component that causes the afterglow effect from the acquired image signal even if the monitor 100 has the red afterglow characteristic. This makes it possible to achieve efficient visible light communication.

Note that although the case of reducing the influence of the red afterglow is also described here, it is obvious that the present disclosure can also apply to the afterglow of blue or green color and a similar measure can be taken as well by controlling to reduce the influence of the corresponding color components.

4. Other Exemplary Embodiments

In the above exemplary embodiments, the method of preventing the influence of the afterglow by means of the monitor 100 or the mobile terminal 200 has been described. In addition to this, the influence of red afterglow may also be reduced by using a physical method such as disposing a filter for blocking red to the image display unit 121 of the monitor 100.

Further, in the above exemplary embodiments, to reduce the influence of a specific color component or to restrict a specific color component is not limited to the absence of the specific color component but includes that the value or amount of the specific color component is small compared to other color components.

The present disclosure is applicable to a device that performs communication using visible light. Specifically, the present disclosure is applicable to a monitor including a television that can be used as a light source for visible light communication, a mobile terminal that can be used as a receiver for visible light communication, and the like.

In understanding the scope of the present disclosure, the term "configured" as used herein to describe a component, section, or a part of a device includes hardware and/or software that is constructed and/or programmed to carry out the desired function.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms "including," "having," and their derivatives. Also, the terms "part," "section," "portion," "member," or "element" when used in the singular can have the dual meaning of a single part or a plurality of parts.

While only selected exemplary embodiments have been chosen to illustrate the present invention, it will be apparent to those skilled in the art from this disclosure that various changes and modifications can be made herein without departing from the scope of the invention as defined in the appended claims. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the exemplary embodiments according to the present invention are provided for illustration only, and not for the purpose of limiting the invention as defined by the appended claims and their equivalents.

What is claimed:

1. A visible light communication device capable of communicating with an other communication device, the visible light communication device comprising:
   an image acquisition unit for acquiring a first image signal including an R component, a G component, and a B component, the first image signal being output based on a communication signal of the visible light communication; and
   an image processing unit for outputting a second image signal in which an influence of the R component of the first image signal is reduced during the visible light communication with the other communication device.

2. The visible light communication device according to claim 1, further comprising
   a display unit for displaying the second image signal.

3. The visible light communication device according to claim 2, further comprising
   a memory for storing information indicating whether or not the visible light communication device has a red afterglow characteristic, wherein
   the image processing unit, based on the information, selects an image that does not include the R component, only when the visible light communication device has the red afterglow characteristic, and the image processing unit outputs the second image signal based on the selected image.

4. The visible light communication device according to claim 1, wherein
   the image processing unit selects image data in which the R component is limited, and outputs the second image signal based on the selected image data.

5. The visible light communication device according to claim 1, wherein
   the communication signal is a PWM signal, and
   the image processing unit outputs the second image signal by changing a duty ratio of the communication signal.

6. The visible light communication device according to claim 1, further comprising:
   a decoding unit for reading information of the communication signal from the second image signal, wherein
   the image acquisition unit includes an imaging unit.

7. The visible light communication device according to claim 6, wherein
   the imaging unit acquires the first image signal from an image data captured by the imaging unit, and
   the image processing unit outputs the second image signal by setting the R component of the first image signal to a restricted value.

8. The visible light communication device according to claim 6, wherein
   the imaging unit includes an image sensor that includes a red sensor, a blue sensor, and a green sensor, and
   the image processing unit removes the R component from the first image signal by means of restricting an operation of the red sensor, and outputs the second image signal.

9. A visible light communication system comprising:
   a terminal device that is the visible light communication device according to claim 6; and
   a display device capable of communicating with the terminal device.

10. The visible light communication system according to claim 9, wherein
    the display device is a display device that has a screen capable of displaying an image, and at least while the display device and the other communication device perform visible light communication, the display device includes:
- a first image area for displaying an image signal including at least one of a G component and a B component; and
- a second image area capable of displaying an image signal including only an R component.

11. The visible light communication device according to claim 1, further comprising
- a memory for storing information of an image when the visible light communication is successful and identification information of the other communication device, wherein
- the image processing unit outputs the second image signal based on the information in the memory.

12. A visible light communication system, comprising:
- a display device that is the visible light communication device according to claim 1; and
- a terminal device capable of communicating with the display device.

13. The visible light communication system according to claim 12, wherein
- the terminal device and the display device are connected by wireless communication based on information transmitted or received through the visible light communication, subsequent to the visible light communication.

14. A visible light communication method using a device capable of performing visible light communication, comprising:
- acquiring a first image signal including an R component, a G component, and a B component, the first image signal being output based on a communication signal of the visible light communication;
- outputting a second image signal in which an influence of the R component of the first image signal is reduced during the visible light communication; and
- displaying the second image signal on a display unit or reading information of the communication signal from the second image signal.

15. A display device including a screen capable of displaying an image, the display device comprising, at least while the display device and an other communication device perform visible light communication:
- a first image area for displaying an image signal that includes at least one of a G component and a B component; and
- a second image area capable of displaying an image signal including only an R component.

16. A visible light communication device capable of communicating with an other communication device, the visible light communication device being configured to transmit or receive data by switching a backlight OFF or ON, the visible light communication device comprising:
- an image acquisition unit for acquiring a first image signal including an R component, a G component, and a B component, the first image signal being output based on a communication signal of the visible light communication; and
- an image processing unit for outputting a second image signal in which an influence of the R component of the first image signal is reduced during the visible light communication with the other communication device.

* * * * *